United States Patent
Bocca et al.

(10) Patent No.: US 12,387,374 B1
(45) Date of Patent: Aug. 12, 2025

(54) LOCALIZATION OF DEVICES IN A STRUCTURE

(71) Applicant: Amazon Technologies, Inc., Seattle, WA (US)

(72) Inventors: Maurizio Bocca, Seattle, WA (US); Amod Kant Agrawal, Santa Clara, CA (US); Lakshmi Venkatraman, Los Altos, CA (US); Chaitanya Desai, Leander, TX (US); Wontak Kim, Watertown, MA (US); Paraskevas Argyropoulos, Billerica, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/542,252

(22) Filed: Dec. 15, 2023

(51) Int. Cl.
  *G06T 7/73* (2017.01)
  *G06T 15/06* (2011.01)
  *H04W 64/00* (2009.01)

(52) U.S. Cl.
  CPC ............... *G06T 7/75* (2017.01); *G06T 15/06* (2013.01); *H04W 64/003* (2013.01); *G06T 2200/24* (2013.01); *G06T 2207/10028* (2013.01); *G06T 2210/56* (2013.01)

(58) Field of Classification Search
  CPC ....... G06T 7/75; G06T 15/06; G06T 2200/24; G06T 2207/10028; G06T 2210/56; H04W 64/003
  See application file for complete search history.

(56) References Cited

U.S. PATENT DOCUMENTS

| | | | |
|---|---|---|---|
| 8,818,706 B1* | 8/2014 | Ogale | G01C 21/206 |
| | | | 701/434 |
| 10,823,562 B1* | 11/2020 | Carnahan | G01C 21/3804 |
| 10,863,314 B2* | 12/2020 | Hollar | H04W 4/33 |
| 11,138,802 B1* | 10/2021 | Al-Mojel | G09B 23/40 |
| 11,481,925 B1* | 10/2022 | Li | G06T 7/75 |
| 2007/0257839 A1* | 11/2007 | Srinivasan | G01S 5/0249 |
| | | | 342/458 |
| 2014/0266669 A1* | 9/2014 | Fadell | H04W 4/80 |
| | | | 340/501 |
| 2015/0235367 A1* | 8/2015 | Langer | G01S 5/0247 |
| | | | 348/135 |
| 2018/0232608 A1* | 8/2018 | Pradeep | G06V 40/166 |
| 2018/0247122 A1* | 8/2018 | Dong | G06T 7/579 |
| 2019/0246241 A1* | 8/2019 | Hollar | H04W 4/33 |
| 2019/0370998 A1* | 12/2019 | Ciecko | G06T 7/248 |
| 2019/0385373 A1* | 12/2019 | Mittleman | G08B 29/18 |

(Continued)

*Primary Examiner* — Ariel A Balaoing
(74) *Attorney, Agent, or Firm* — Kilpatrick Townsend & Stockton LLP

(57) ABSTRACT

Disclosed are various embodiments for localizing smart devices in a structure. An image of a portion of at least one room of a structure may be rendered on a display of the mobile device. A point in the image may be determined where a nonlocalized device is depicted, the nonlocalized device being positioned in the at least one room of the structure. The nonlocalized device is localized in the at least one room of the structure based on a position and orientation of the mobile device relative to the at least one room of the structure and based on a location of the point in the image. Alternatively, a location of a nonlocalized device in the structure may be determined by using the location of a mobile device as proxy.

23 Claims, 13 Drawing Sheets

(56) References Cited

U.S. PATENT DOCUMENTS

| | | | |
|---|---|---|---|
| 2020/0050215 A1* | 2/2020 | Kessler | A47L 11/4011 |
| 2020/0226383 A1* | 7/2020 | Meier | G06V 10/17 |
| 2022/0155880 A1* | 5/2022 | Martin | G06F 3/0482 |
| 2022/0201460 A1* | 6/2022 | Williams | G16H 40/67 |
| 2022/0272303 A1* | 8/2022 | Kurniawan | G06T 7/70 |
| 2023/0035360 A1* | 2/2023 | Holland | G06V 10/758 |
| 2023/0130770 A1* | 4/2023 | Miller | G06N 20/00 |
| | | | 345/156 |
| 2023/0169839 A1* | 6/2023 | Russell | G08B 13/19684 |
| | | | 340/540 |
| 2023/0290072 A1* | 9/2023 | Hovden | G06T 7/74 |
| 2023/0326053 A1* | 10/2023 | Waheed | G01S 7/4808 |
| | | | 382/154 |

* cited by examiner

LOCALIZATION OF DEVICES IN A STRUCTURE

BACKGROUND

Recent advances in networking infrastructure have resulted in the streaming of content over the world wide web using smart devices. In addition, the advent of smart devices in the home provides for greater convenience and control in the home. Such advancements have resulted in a proliferation of so called smart devices and other devices in commercial and residential structures.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

A given structure such as a home may have multiple different smart devices that automate various activities in the home. Such smart devices may comprise smart bulbs, smart speakers, digital media players, and other smart devices. Some of these smart devices may communicate with other ones of the smart devices to accomplish a task. For example, a user may ask a smart speaker that provides for a digital virtual assistant to change the channel played by a digital media player. However, when there are multiple digital media players in the home, the digital virtual assistant may not know which digital media player to which the request is directed and may change the channel on the wrong digital media player.

According to various embodiments, different approaches are provided to localize smart devices in a structure such as a home or business using a mobile device such as a smart phone. To localize smart devices that transmit radio frequency signals or audio, a distance between such smart devices and multiple points in the structure may be determined by way of measuring signal strengths or by sonic ranging using a mobile device whose position in the structure is known. These distances may be used to localize such smart devices by way of multilateration or other approaches. For smart devices for which such an approach is not possible, localization may be performed by tapping on a screen of a mobile device to indicate the position of such devices on the screen and using ray casting techniques to determine a location for such devices relative to a point cloud created for rooms of the structure. In addition, devices may be localized by placing the mobile device next to such smart devices and using the location of the mobile device as the location of such smart device.

In the following discussion, a general description of the system and its components is provided, followed by a discussion of the operation of the same.

Figure 1:
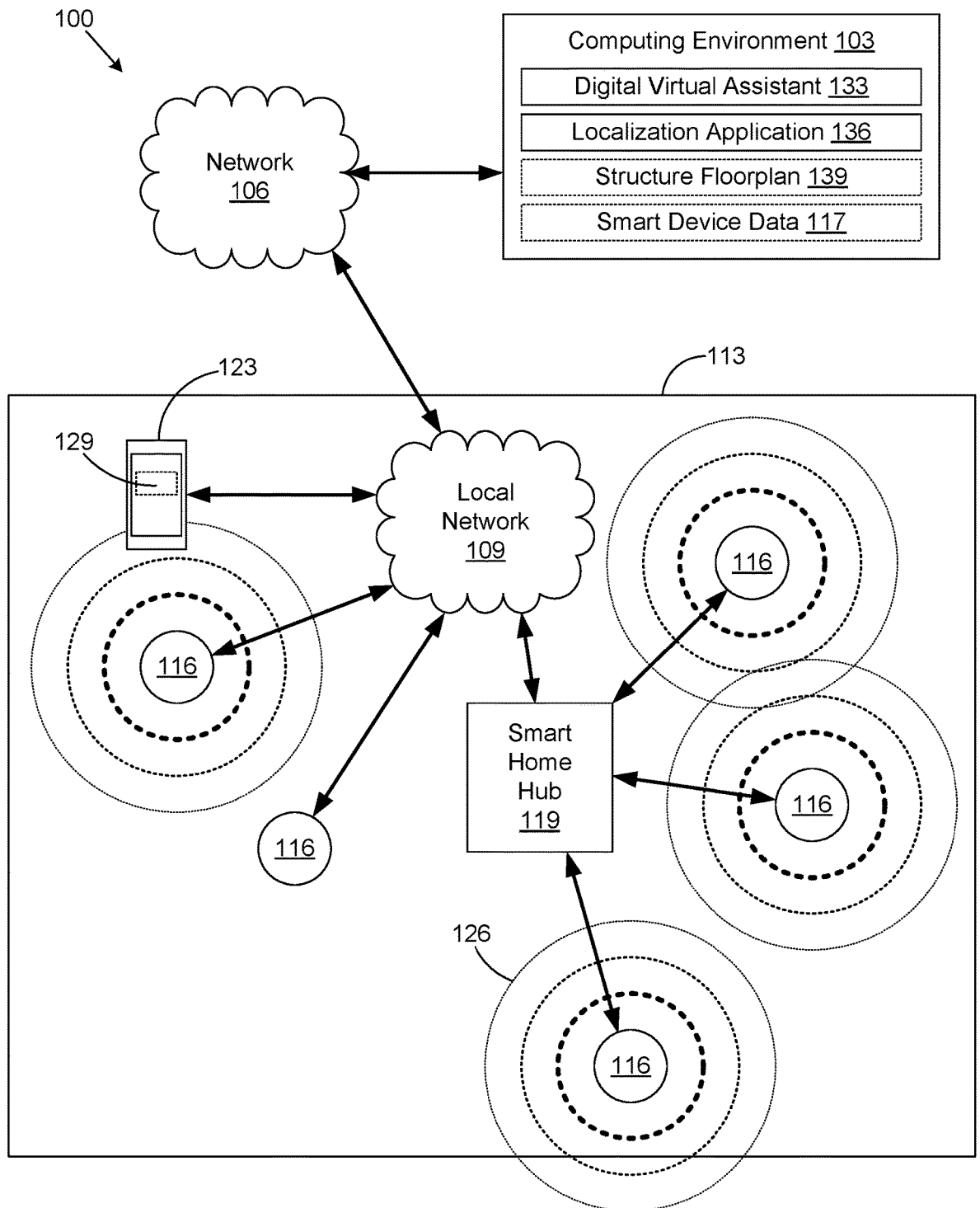
FIG. 1 is a drawing of a networked environment that includes a mobile device and smart devices in a structure according to various embodiments of the present disclosure.

With reference to FIG. 1, shown is a networked environment 100 according to various embodiments. The networked environment 100 includes a computing environment 103 that is coupled to a network 106.

The computing environment 103 may comprise, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource and/or any other distributed computing arrangement. In some cases, the computing environment 103 may correspond to an elastic computing resource where the allotted capacity of processing, network, storage, or other computing-related resources may vary over time.

The network 106 may comprise, for example, the Internet and other networks as can be appreciated.

The network 106 is coupled to, and in data communication with, a local area network 109 that is associated with a structure 113. The structure 113 includes one or more rooms. The local area network 109 may comprise, for example, wide area networks (WANs), local area networks (LANs), wired networks, wireless networks, cellular networks, or other suitable networks, etc., or any combination of two or more such networks. For example, such networks may comprise Ethernet networks, wireless fidelity (WIFI) networks, and other types of networks.

Associated with the structure 113 are a plurality of smart devices 116. The smart devices 116 may comprise, for example, smart speakers, virtual assistants, smart bulbs, smart switches, temperature sensors, thermostats, contact sensors, smart plugs, cameras, digital media players, and other devices. According to one embodiment, a location of many of the smart devices 116 within a room of the structure 113 may not be known by other systems. Also associated with the structure is a smart home hub 119 that communicates with respective ones of the smart devices 116. In this respect, the smart home hub 119 may communicate with various ones of the smart devices 116 by way of one or more network protocols such as WIFI, Zigbee, Zwave, or other protocols. Also, the smart home hub 119 may be coupled to the local area network 109 by way of a hardwire connection such as an Ethernet connection or communication between the smart home hub 119 and the local area network 109 may comprise a wireless connection such as WIFI or other connection.

Some of the smart devices 116 are capable of transmitting electromagnetic signals 126 such as Bluetooth Low Energy (BLE) signals, WIFI signals, or other wireless signals. In one embodiment, such signals 126 announce the presence of a respective device including information about the device, the transmission power, and other information.

Also, smart devices 116 may comprise a smart speaker that is capable of transmitting audio that may be used for sonic ranging as will be described.

A mobile device 123 may be located within the structure from time to time. According to one embodiment, the mobile device 123 comprises a smart phone that communicates, for example, by way of a cellular network or WIFI. The mobile device 123 may be in data communication with the computing environment 103 and the various smart devices 116 through the local area network 109. Alternatively, the mobile device 123 may communicate with the devices on the local area network 109 through the network 106 where the network 106 includes a cellular network as can be appreciated.

Various applications that may be executed on the mobile device 123 include, for example, a mobile localization application 129 and other applications. The mobile localization application 129 is executed to localize the smart devices 116 by identifying their positions within one or more rooms within the structure 113 as will be described.

According to various embodiments, the computing environment 103 includes various applications and data. For example, the applications may comprise instances of a digital virtual assistant 133, a localization application 136, and other applications not described herein. Also, various data may be stored a data store that is accessible by the digital virtual assistant 133, the localization application 136, and other applications. Such data includes, for example, a structure floorplan 139 and smart device data 117 that includes data about each of the smart devices 116 that are associated with the structure 113 as will be described. The structure floorplan 139 comprises a floorplan of the structure 113 according to one embodiment.

The digital virtual assistant 133 comprises a system that resides in the computing environment 103 and performs various tasks such as voice interaction, playing music, creating to-do lists, providing information such as weather, traffic, news, or other information. The digital virtual assistant 133 may also control various smart devices 116 that are in data communication with the local area network 109 and the network 106. For example, the digital virtual assistant 133 may control lights, audio components, and other smart devices 116 associated with the structure. In one embodiment, the digital virtual assistant 133 employs natural language processing in order to receive commands from people and perform tasks accordingly.

In order to exercise control over various smart devices 116, one or more of the smart devices 116 associated with the structure 113 are surfaced to or otherwise made known to the digital virtual assistant 133 and are included in the smart device data 117. To this end, the digital virtual assistant 133 may be in communication with the smart home hub 119 or with other smart devices 116 directly coupled to the local area network 109 in order to exercise control over such smart devices 116. For example, one might ask the digital virtual assistant 133 to turn on the lights in a given room and the digital virtual assistant 133 would communicate with the smart home hub 119 or individual light bulbs coupled to the local area network 109 to turn on the respective lights associated with the specified room. To this end, at least some of the smart devices 116 may be "digital virtual assistant" capable providing an interface by which a user may interact with the digital virtual assistant 133. In this respect, such devices may relay questions or commands to the digital virtual assistant 133 that is executed in the computing environment 103. In response to such questions or commands, the digital virtual assistant 133 may implement tasks and take such action as is appropriate. For example, the digital virtual assistant 133 may send a command to a smart device 116 coupled to the local area network 109 or to the smart home hub 119 that directs certain action be taken with respect to certain smart devices 116 such as turning lights on or off, closing or opening blinds, enabling or disabling security systems, or other action.

Figure 2:
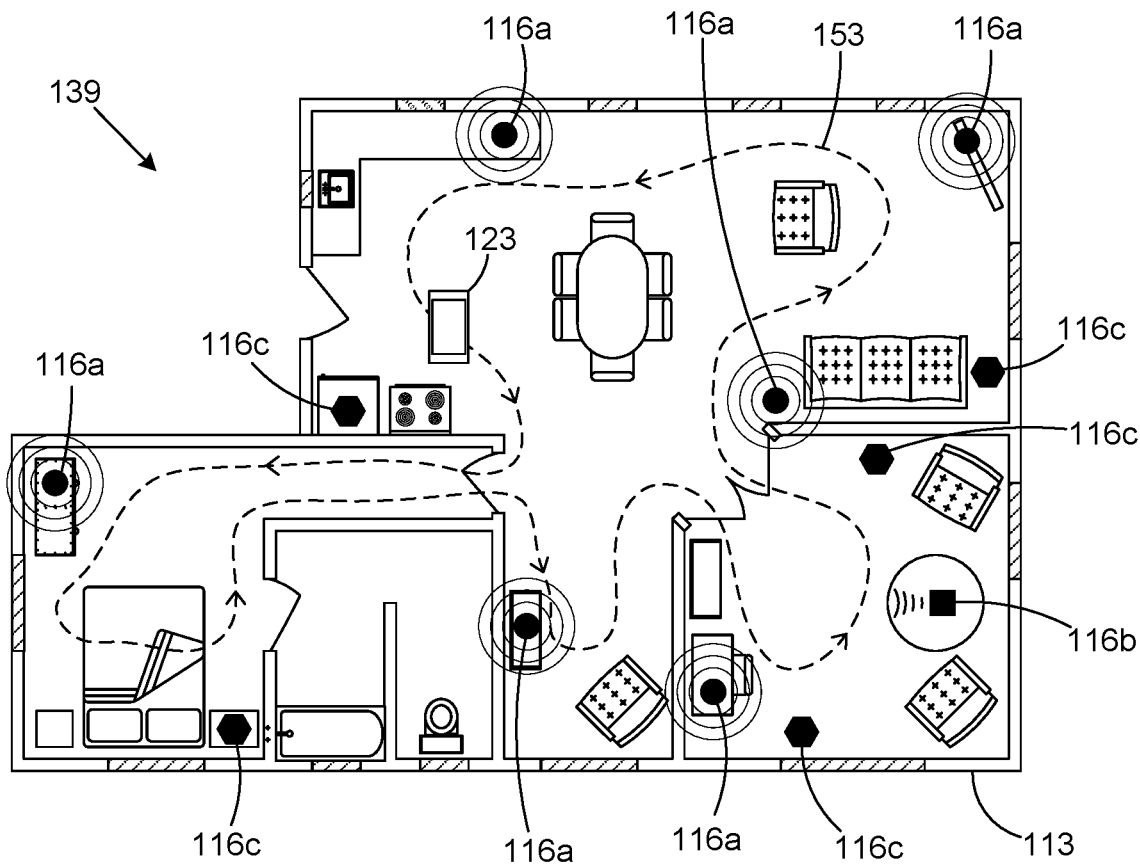
FIG. 2 is a depicts a structure floor plan that includes smart devices included in the networked environment of FIG. 1 according to various embodiments of the present disclosure.

Referring next to FIG. 2, shown is an example of a structure floorplan 139 of the structure 113 (FIG. 1) with which a number of smart devices 116a-c are associated. As shown, a plurality of smart devices 116a, 116b, and 116c that are positioned at various locations throughout the structure floorplan 139.

The smart devices 116a are capable of transmitting electromagnetic signals or radio frequency signals such as WIFI signals, Bluetooth Low Energy (BLE) signals, Zigbee signals, or Zwave signals to communicate with other devices. Such signals may be remeasured in terms of Milliwatts (mW), decibels in relation to milliwatts (dBm), or some other units of measurement. For example, a BLE signal is typically designed for low power consumption transmitting data in the 2.4 GHZ frequency band. In another example, WIFI signals are transmitted in bands located at 2.4 GHz, 5 GHz, and other frequency bands.

The signals transmitted by smart devices 116a embody and identifier which comprises data that uniquely identifies the transmitting smart device 116a relative to all other smart devices 116 (FIG. 1) associated with a given structure 113. Also, such signal may include information indicating a signal strength transmitted by the smart device 116a. It is understood that such signals will become weaker as they propagate due to geometrical spreading and attenuation in the transmission medium such as air. As such, it is possible to estimate how far away the 123 is from a given smart device 116a based on the received signal strength at the mobile device 123 that is positioned a distance away from the smart device 116a.

The smart devices 116b may comprise, for example, audio devices such as smart speakers and the like. An audio smart devices 116b may provide for sonic ranging to determine the distance between a mobile device 123 and the smart device 116b at a given moment. Specifically, in order to determine a distance from a smart device 116b and the mobile device 123, a sonic pulse can be generated by the smart device 116 at time $T_1$ and the sonic pulse is detected by the mobile device 123 at time $T_2$. Given that the speed of sound through air is known, the distance between the respective smart device 116b and the mobile device 123 may be calculated by determining the time it took for the pulse to travel through the air from the smart device 116b to the mobile device 123. The position of the mobile device 123 when the distance is determined is stored in memory along with a value for the actual distance calculated. This may be repeated multiple times until there are three or more measurements of distance between the respective smart device 116b and the corresponding positions of the mobile device 123 where the sonic pulse generated by the respective smart device 116b was detected by the mobile device 123.

The smart device 116 may be instructed to transmit the sonic pulse at time $T_1$ by the digital virtual assistant 133 (FIG. 1) or some other application. Also, the digital virtual assistant 133 provides the mobile device 123 with time $T_1$ when the sonic pulse was transmitted taking into account a data communication delay between the digital virtual assistant 133 and the mobile device 123 if such a delay is substantial enough for consideration.

The smart devices 116c are those that may not transmit radio frequency signals or audio signals. Alternatively, if the smart devices 116c do transmit radio frequency signals, the device identifier or the transmission signal strength may not be embodied in the signals they broadcast which prevents automatic localization for such devices.

An example of a pathway 153 is noted in the structure floorplan 139 that traces movement of a mobile device 123 (FIG. 1) when scanning the rooms within the structure 113 using a sensor such as a light detection and ranging (LIDAR) sensor or other scanning technology included in the mobile device 123 to generate a point cloud of the rooms of the structure 113 as will be described.

In one embodiment, various ones of the smart devices 116 may be nonlocalized in that the specific locations of such smart devices 116 within the one or more rooms of the structure 113 are not known to the digital virtual assistant 133 or other applications. That is to say, a location of a given smart device 116 within the structure 113 may not be included in the information about the given smart device 116 stored as part of the smart device data 117. As such, the digital virtual assistant 133 would not know where nonlocalized smart devices 116 are positioned with respect to the structure 113. Thus, a nonlocalized smart device 116 refers to smart devices 116, for example, for which a position relative to and/or within the structure 113 is unknown to the digital virtual assistant 133 as the position is not included in the smart device data 117 (FIG. 1).

According to one embodiment, the mobile device 123 may be employed to localize the nonlocalized smart devices 116. As contemplated herein, localizing a nonlocalized smart device 116 refers to identifying the location of such nonlocalized smart device 116 relative to and/or within the structure 113.

Figure 3:
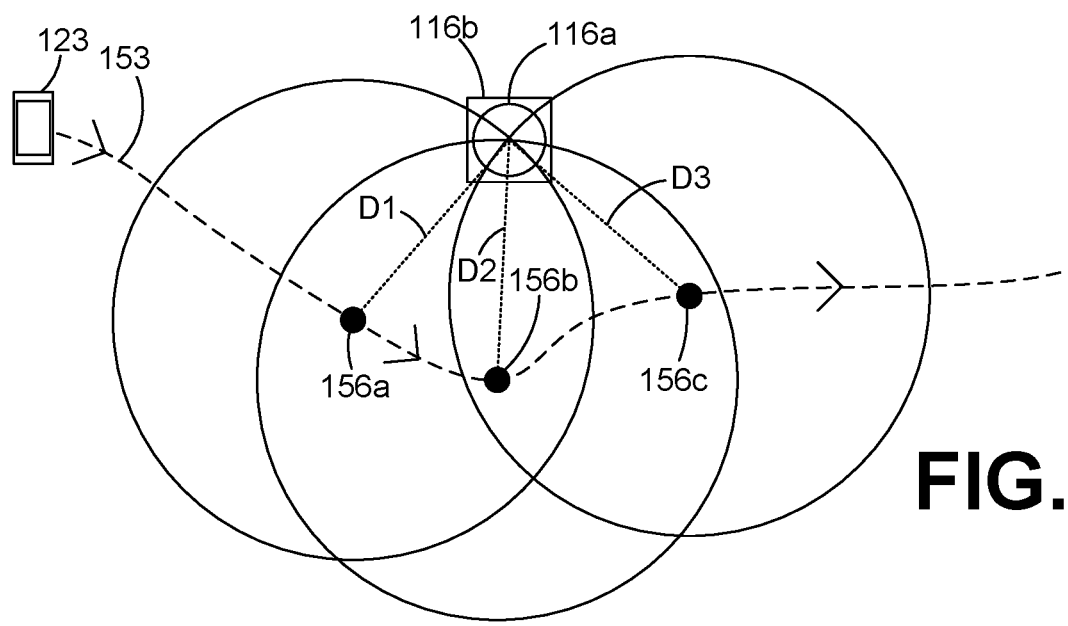
FIG. 3 is a drawing depicting the determination of distances between a smart device of FIG. 2 and multiple points within a structure in order to localize such smart device according to various embodiments of the present disclosure.

With respect to FIG. 3, shown is one example of how a nonlocalized smart device 116a may be localized according to one embodiment. As the mobile device 123 moves around the rooms of the structure 113, its location at any given instant is known based on the ARCore Geospatial API provide by Google, Inc. of Mountain View, California. Alternatively, the mobile device 123 may maintain its position within the structure 113 based on signals from beacons, signals from cell phone towers, Global Positioning System signals, or based on some other approach.

As the mobile device 123 moves along the pathway 153, measurements are taken of the signal strength of radio frequency signals transmitted by one or more smart devices 116a. As shown in FIG. 3, the mobile device 123 acquires measurements of the signal strength of a signal transmitted by any given smart device 116a at three locations 156a, 156b, and 156c. Alternatively, measurements of the signal strength of the signal from each of the smart devices 116a may be taken at many more locations than the three depicted. Also, the mobile device 123 may obtain the identification of the smart device 116a and the transmitted signal strength from the signal itself. When the mobile device 123 is placed in a mode to acquire the measurements of the signal strengths of the respective smart devices 116a as the mobile device 123 moves around the rooms of the structure 113, the signal strength measured and the location in the structure 113 where the signal strength was measured is stored in association with the respective smart device 116a known by virtue of the identifier received in the signal transmitted by the smart device 116a. Also, the transmitted signal strength is associated with the respective smart device 116a and is stored in association with the smart device 116a.

In some cases, the identifier may be encrypted where the actual identifier is known to the digital virtual assistant 133 or other application. In such case, the mobile device 123 may communicate with the digital virtual assistant 133 to provide the encrypted identifier thereto, where the digital virtual assistant 133 or other application transmits the actual identifier to the mobile device 123 in response.

The smart devices 116a may transmit signals in various modes. For example, the transmission of signals may be periodic, ad hoc, or on demand. In a periodic mode, the signals may be transmitted once every second or interval during a specified period of time during the day. Alternatively, in an ad hoc mode, when the mobile device 123 is scanning for smart devices 116a, the mobile device 123 may send a signal to the smart devices 116a to begin to send signals at a high rate such as, for example, 10 times per second or other rate. The smart devices 116a would proceed to send such signals at the predefined rate. When the mobile device 123 is done with scanning function, it sends a signal to the mobile devices 116a to stop transmitting signals, where the smart devices 116a may revert to a periodic mode or other mode of operation. In an on demand mode, the mobile device 123 transmits a signal to the smart device(s) 116a to transmit a signal on demand as needed. The smart device(s) 116a may then respond by transmitting their signal. The mobile device 123 may repeatedly request that smart devices 116a within range transmit their signals as a scan of the structure 113 is performed.

Once the transmitted signal strength and the measured signal strength is known with respect to a given smart device 116a, an estimate of the distances D1-3 between the respective locations 156a-c and the transmitting smart device 116a may be determined given that the signal strength of a radio frequency signal in air trails off predictably with distance due to geometrical spreading and attenuation in the transmission channel.

Alternatively, assuming that the mobile device 123 passes near a smart device 116b, then estimates of the distances D1-3 between respective locations 156a-c and the smart device 116b may be determined by way of sonic ranging as described above. In such case, the identity of the respective smart device 116b is known as the digital virtual assistant controls the smart device 116b to implement sonic ranging as described above.

Once an estimate of the distances D1-3 is known for a given smart device 116a/b, a location of such smart devices 116a/116b can be determined. In one example, the location of the respective smart device 116a may be determined by way of multilateration as shown. Alternatively, the location of the respective smart devices 116a/116b may be determined using other approaches such as by use of matrix factorization, factor graphs, and/or other approaches. In this respect, the smart devices 116a may be localized automatically without further input from the user once a scan of the rooms of the structure 113 is accomplished. That is to say, as the mobile device 123 is moved around the rooms of the structure 113, the mobile device 123 acquires the identifiers, transmitted signal strengths, and locations where the signal strength of each signal from a given smart device 116a is measured. Such data is termed "smart device transmission data" herein. This data acquired for each smart device 116a may be used to automatically localize respective ones of the smart devices 116a without requiring further user action.

In one embodiment, the smart device transmission data may be used to localize the respective smart device 116a. Such data may be transmitted from the mobile device 123 to the localization application 136 (FIG. 1) in the environment 103 (FIG. 1) and stored as part of the smart device data 117 (FIG. 1). Ultimately, the localization application 136 may access such data to determine a location of the respective smart device 116a. Alternatively, the mobile localization application 129 (FIG. 1) may perform this task locally on the mobile device 123.

For smart devices 116c that do not transmit signals, or do not communicate their identifiers or transmitted signal strengths, other approaches may be employed to localize such smart devices 116c as will be described.

Figure 4:
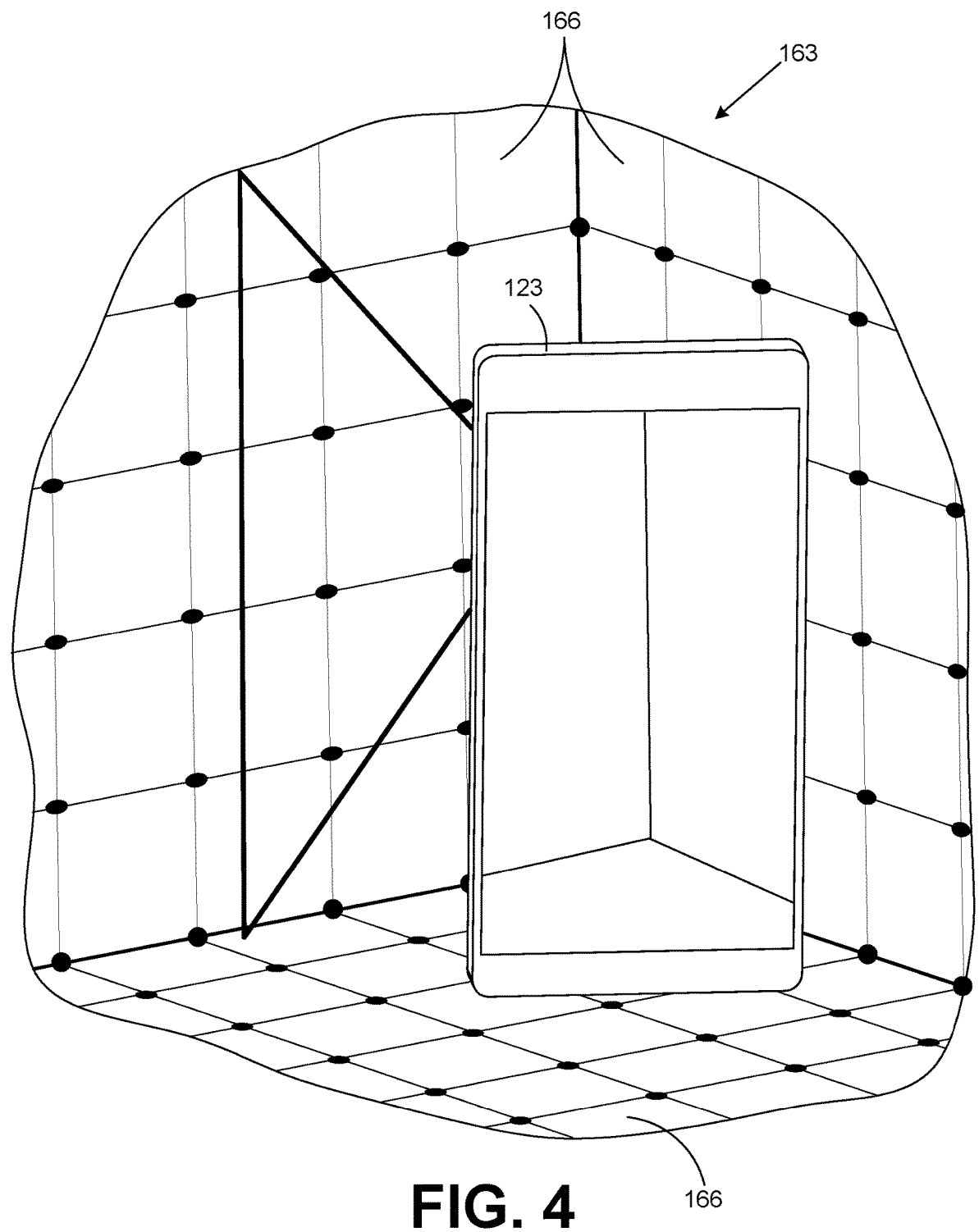
FIG. 4 is a drawing depicting the generation of a point cloud that represents rooms of the structure using the mobile device of FIG. 1 according to various embodiments of the present disclosure.

Referring next to FIG. 4, shown is an example of a portion of a point cloud 163 that is generated by the mobile device 123. The point cloud 163 comprises a gridwork or other arrangement of points that represent the structural boundaries 166 of the one or more rooms of the structure 113 (FIG. 2). The point cloud 163 is generated from a scan using a sensor on the mobile device 123 such as a light detection and ranging (LIDAR) sensor or other type sensor. In particular, the scan is performed as the user follows a pathway 153 (FIG. 2) within the structure 113. In this respect, the sensor of the mobile device 123 is used to sense of the structural boundaries 166 as the mobile device 123 is moved around one or more rooms of the structure 113. The resulting data representing the point cloud 163 is stored in the memory of the mobile device 123 and also is transmitted to and stored in memory associated with the computing environment 103 to be accessed by the localization application 136 to be used in localizing certain ones of the smart devices 116 (FIG. 1) as will be described.

Figure 5:
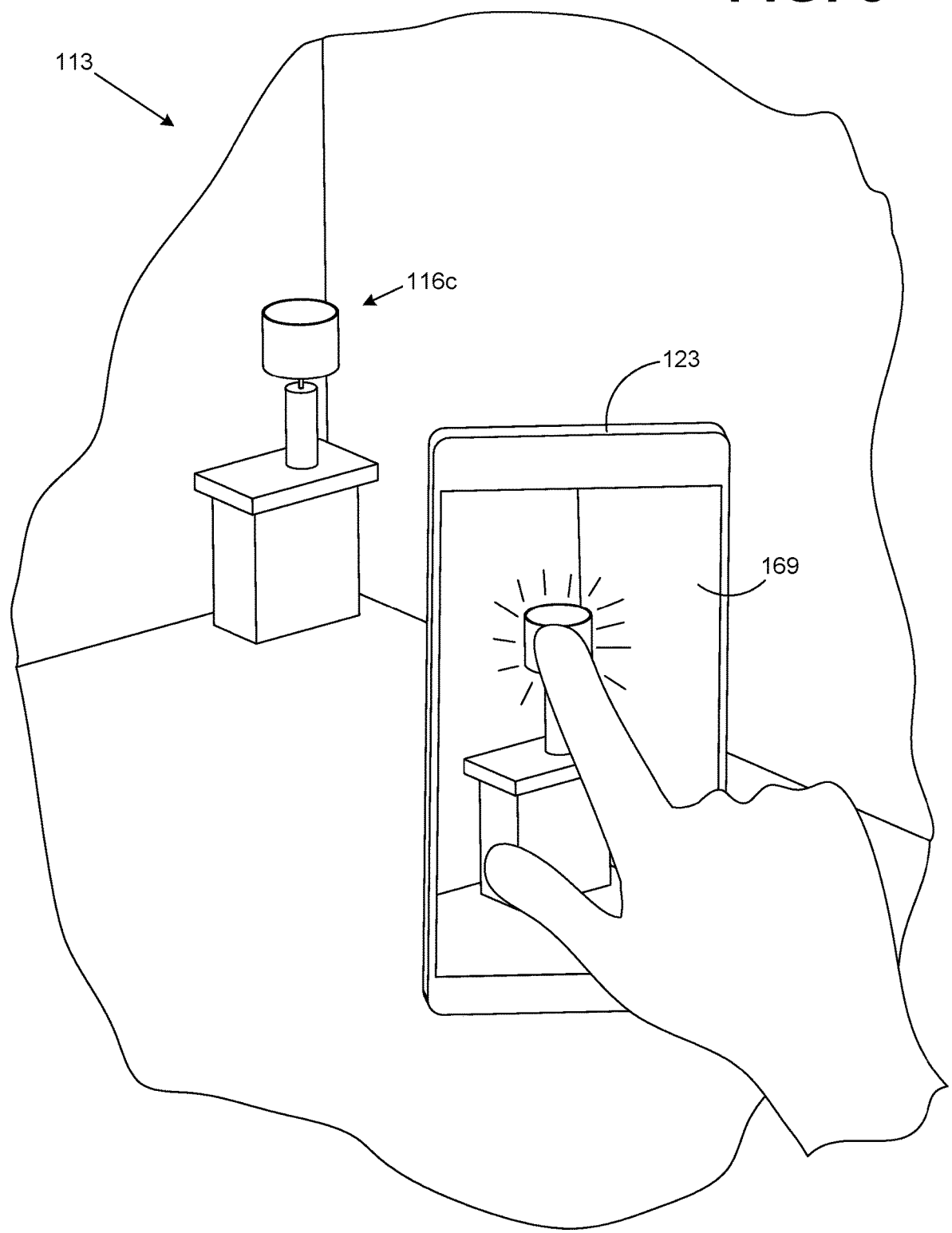
FIG. 5 is a drawing depicting a tap to locate approach to localizing one of the smart devices of FIG. 1 according to various embodiments of the present disclosure.

With reference to FIG. 5, shown is an example of a portion of a room within the structure 113 (FIG. 2) that is also depicted on a display of the mobile device 123 according to one embodiment. As mentioned above, the mobile device 123 maintains its location within the various rooms of the structure 113 as a user moves around the structure 113 as described above. The movement of the mobile device 123 may occur when the point cloud 163 is being generated as mentioned above, or to obtain the smart device transmission data described above. In this respect, the user may place the mobile device 123 into a mode where smart devices 116c may be identified as will be described.

From time to time, a nonlocalized smart device 116c may appear in the display 169 of the mobile device 123. In one embodiment, the display 169 comprises a touch screen. As depicted in FIG. 5, the smart device 116c may comprise a smart bulb or other lighting device. Assuming the nonlocalized smart device 116c is not capable of transmission of a radio frequency signal or an audio signal, or that the transmission signal strength is not provided by way of a signal transmitted by such smart device 116c, in order to localize the smart device 116c, a user may tap on the smart device 116c as rendered on the display 169 of the mobile device 123 to identify the smart device 116c for purposes of localization. The user may tap on the smart device 116c with their finger, knuckle, a stylus, or other item. A "tap" on the display 169 of the mobile device 123 refers to directing a finger, knuckle, stylus, or other item to collide with the display 169 of the mobile device 123 as can be appreciated.

The mobile device 123 includes an inertial measurement unit (IMU) that includes, for example, a three dimensional accelerometer, a gyroscope, and a magnetometer. At any given time, the IMU generates values that indicate the orientation of the mobile device 123. When a user taps on the display 169 of the mobile device 123, several tap localization data items are stored in memory in the mobile device 123 that facilitate the localization of the respective smart device 116a. The tap localization data includes, for example, the orientation and location of the mobile device 123 when the display 169 is tapped. Also, a copy of the image depicted in the display 169 may be stored. In addition, a position of the tap on the display 169 is stored. Further, any magnification or zoom setting of the camera of the mobile device 123 that generates the image in the display 169 is also stored.

The tap localization data may be transmitted to the localization application 136 (FIG. 1) which localizes the respective smart device 116c by determining an approximate the location of the corresponding smart device 116a. Alternatively, the mobile localization application 129 (FIG. 1) may perform this task locally on the mobile device 123.

Before either the localization application 136 or the mobile localization application 129 are able to localize a smart device 116c based on corresponding tap localization data, at least the portion of the point cloud 163 that coincides with the image that includes the smart device 116c to be localized needs to be generated. This is because in localizing a respective smart device 116a, a ray casting operation is performed by the localization application 136 or the mobile localization application 129.

A ray casting operation involves mathematically or algorithmically casting a "ray" from a location associated with the mobile device 123 (e.g. in a first coordinate system or point cloud) based on a known orientation of the mobile device (e.g. with respect to the first coordinate system or point cloud) to a position on the point cloud 163 that is ultimately taken as the approximate location of the respective smart device 116a. The location and orientation of the mobile device relative to a coordinate system or point cloud can be characterized as a pose of the mobile device relative to the coordinate system or point cloud.

The ray casting operation is performed based on the tap localization data described above. If the point cloud 163 was not created, the ray casting operation could not be performed.

In order to facilitate performing the ray casting operation, the area of contact of a tap on the display 169 may be reduced to a single pixel. That is to say, if the area of contact of a given tap comprises, for example, a portion of a fingerprint or other area of contact, an approximate center of the portion of the fingerprint on the display 169 may be identified to reduce the area of the tap to a single pixel. The location of this pixel on the display 169 or in the corresponding image may be used to perform the ray casting operation.

Note that the actual position on the point cloud 163 identified for a respective smart device 116c may be an approximation of the actual position of the smart device 116c. For example, in one example, a smart device 116c may be positioned in front of a wall on a small table. A gap may exist between the smart device 116c and the wall. A ray casting operation would localize the smart device 116c to the wall itself given that the point cloud 163 ideally coincides with the wall. Assuming the position on the point cloud 163 that intersects with the mathematical ray generated in the ray casting operation is reasonably close to the actual smart device 116c positioned near the wall, then such inaccuracy may be tolerated given that it is perhaps more important to localize the smart device 116c as being positioned in a particular room of the structure 113.

Once a location is determined for the smart device 116c, the location coordinates are ultimately stored in a memory associated with the computing environment 103 as the smart device data 117 (FIG. 1). In the event that the mobile localization application 129 is executed to determine the location of a given mobile device 123, then the mobile localization application 129 would transmit the location coordinates to the computing environment 103 for storage as the smart device data 117.

Figure 6:
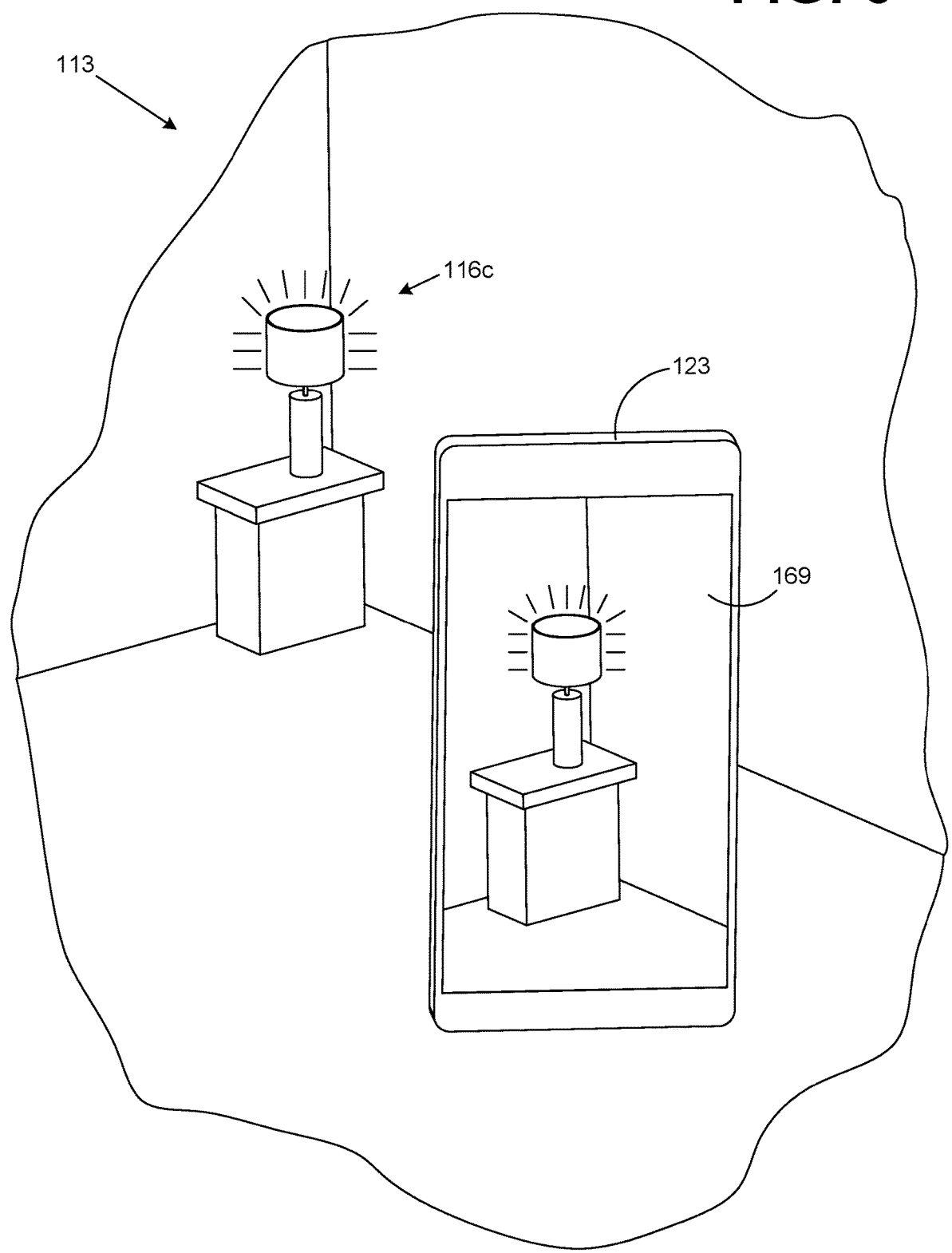
FIG. 6 is a drawing depicting a self-identification signaling approach to localizing one of the smart devices of FIG. 1 according to various embodiments of the present disclosure.

Referring next to FIG. 6, shown is a further example of a portion of a room within the structure 113 (FIG. 2) that is also depicted on a display of the mobile device 123 according to one embodiment. As mentioned above, the mobile device 123 maintains its location within the various rooms of the structure 113 as a user moves around the structure 113 as described above. The movement of the mobile device 123 may occur when the point cloud 163 is being generated, or to obtain the smart device data 117 described above. If the mobile device 123 is used to obtain the smart device data 117 without generating the point cloud 163, the user may place the mobile device 123 into a mode where smart devices 116c may be identified as will be described.

As shown in FIG. 6, a portion of a room of the structure 113 is depicted, where the mobile device 123 generates an image of the same on the display 169. A smart device 116c is positioned in the portion of the room depicted and also appears in the image rendered on the display 169.

According to one embodiment, the smart device 116c is capable of self-identification signaling. Self-identification signaling refers to an ability of a given smart device 116c to be controlled to impart a visual indication of its presence. For example, if a given smart device 116c comprises a smart bulb, it may be controlled to turn on and impart light of a specific color. If there are several such smart bulbs in the structure 113, each such smart bulb may be controlled to generate light in a color that is unique with respect to all other smart bulbs. In this way, each such smart bulb can distinguish itself from all others in the structure 113 based on the color it displays.

Alternatively, a self-identification signaling smart device 116c may be controlled to indicate a code that is different from other similar self-identification signaling smart devices 116c. For example, if such a smart device 116c is a smart bulb, then such device may be turned on and off according to a predefined sequence that is unique with respect to sequences of other such smart bulbs in the structure 113. Stated another way, where the self-identification signaling smart device 116c is a light bulb, the self-identification signaling may comprise cycling the light bulb according to a first on-off signaling sequence that is unique with respect to one or more second on-off signaling sequences of one or more other light bulbs in the structure 113. In another embodiment, the self-identification signaling further comprises illuminating the light bulb at a first level of brightness that is unique with respect to a second level of brightness of one or more other light bulbs in the structure 113.

Also, automated blinds might be moved in a unique way with respect to each other. Thus, in one embodiment self-identification signaling smart devices 116c may each self-identify by generating a unique visual appearance or coded operation that differs from the visual appearances or coded operation of all other such self-identification signaling smart devices 116c.

In order to cause each of the self-identification signaling smart devices 116c to engage in self-identification signaling as described above, the mobile device 123 may be controlled to send a request to the digital virtual assistant 133 (FIG. 1) to cause all of the self-identification signaling smart devices 116c to engage in self-identification signaling. Also, if localization of such smart devices 116c is to be performed by way of the mobile localization application 129 (FIG. 1), the mobile device 123 may also request a list of the smart devices 116c that indicates their respective self-signaling behaviors so that the mobile localization application 129 can identify such mobile devices 116c once the list is received. Alternatively, the mobile localization application 129 may communicate directly with the mobile devices 123 or with the smart home hub 119 to cause such devices to engage in self-identification signaling.

If the respective smart devices 116c are controlled to engage in self-identification signaling, the mobile device 123 may encounter one of such smart devices 116c as the mobile device 123 is moved around the rooms of the structure 113. In one embodiment, the mobile localization application 129 detects a self-identification signaling on the part of a smart device 116c in the image depicted in the display 169. If the self-identification signaling comprises illuminating a smart device 116c such as a smart bulb with a predefined color, such smart device 116c may be detected by identifying the color in the image. Alternatively, where the self-identification signaling comprises causing a smart device 116c to display the self-identification signaling behavior such as cycling a smart bulb on and off according to a predefined timed sequence.

Once detected, a position of the smart device 116c that displays the self-identification signaling within the image rendered by the display 169 may be determined from the self-identification signaling displayed. For example, where the smart device 116c is a smart bulb, a point that is the approximate center of the self-identification signaling smart device 116c may be identified. Specifically, first the area of pixels on the display 169 that render the self-identification signaling smart device 116c are identified and the approximate center of such area is calculated. In order to localize the self-identification signaling smart device 116c, certain self-identification signaling device data is stored in a memory. Such self-identification signaling device data may comprise, for example, the position and orientation of the mobile device 123, a screen shot or image that depicts the self-identification signaling smart device 116c, the location of the self-identification signaling smart device 116c within the screen shot or display 169, a description of the self-identification signaling detected, and potentially other data. Note that if the self-identification signaling comprises an on-off signaling sequence over time, the self-identification signaling device data may include an excerpt of video instead of a screen shot or image.

This data may be used to localize the respective device. Such data may be transmitted from the mobile device 123 to the localization application 136 (FIG. 1) in the environment 103 (FIG. 1) and stored as part of the smart device data 117 (FIG. 1). Ultimately, the localization application 136 may access such data to determine a location of the respective smart device 116c. Alternatively, the mobile localization application 129 (FIG. 1) may perform this task locally on the mobile device 123.

Once the point that identifies the position of the self-identification signaling smart device 116c on the display 169 has been determined, then an approximate location of the respective smart device 116c may be identified using ray casting as was described above with respect to the discussion of FIG. 5. Rather than surface a list of smart devices 116c so that a user may select the smart device 116c depicted in a screen shot or image, the self-identification signaling may be employed to identify a respective one of the smart devices 116c with which the location determined for such smart device 116c is associated.

Figure 7:
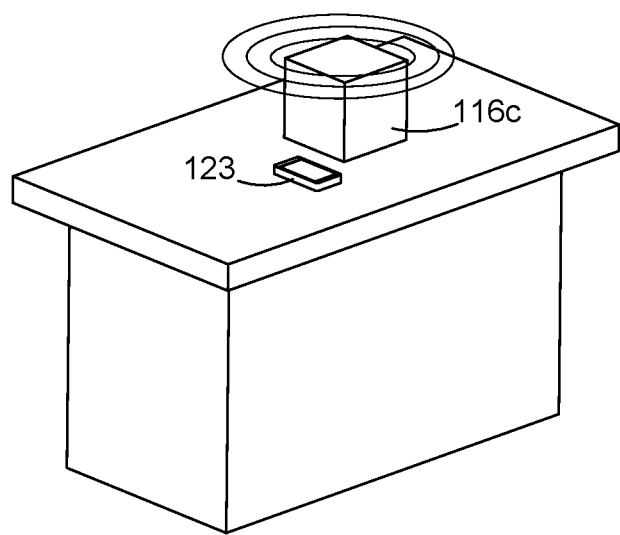
FIG. 7 is a drawing depicting a location by proximity approach to localizing one of the smart devices of FIG. 1 according to various embodiments of the present disclosure.

With reference to FIG. 7, shown is an example of how a smart device 116c may be localized by way of proxy localization. As shown, a smart device 116c is placed on a surface such as a table or other surface. In one embodiment, the mobile device 123 is placed near the smart device 116c. The mobile device 123 may be placed in a mode that facilitates localization of smart devices 116 (FIG. 1) by way of proxy localization. Alternatively, proxy localization may be performed at any time during the generation of the point cloud 163 (FIG. 4) or while localizations Once this mode is implemented, a user may place the mobile device 123 adjacent to the smart device 116c. In one embodiment, the mobile device 123 is placed within a predefined distance from the smart device 116c, where the predefined distance may comprise 1 foot or other distance. In another embodiment, the user may place the mobile device 123 next to the smart device 116c such that the mobile device 123 touches the smart device 116c.

In addition, if the smart device 116c is capable of transmitting a radio frequency signal, then the mobile device 123 may determine whether it is close enough to the smart device 116c for proxy localization by sensing the signal strength. In one embodiment, the mobile device 123 may signal when it is close enough to the smart device 116c for proxy localization by way of an indication on the display 169 (FIG. 6), haptic feedback, or other signal.

In one embodiment, when the mobile device 123 is determined to be stationary in a given position for a predefined period of time, then the position of the mobile device 123 may be taken as the location of the respective smart device 116c. The inertial measurement unit (IMU) may detect that the mobile device 123 is in a stationary position and the mobile localization application 129 may determine whether the mobile device 123 has been stationary for the predefined period of time. Thereafter, a list of nonlocalized smart devices 116 may be presented on the display 169 so that a user may select the respective smart device 116c for which proxy localization has been performed. In this manner, the location of the mobile device 123 proximate to the respective smart device 116c may be associated with the respective smart device 116c. This information may be sent to the localization application 136 (FIG. 1) so that it may be properly located in the structure floorplan 139 so that the digital virtual assistant 133 can know where the respective smart device 116c is located when performing tasks and the like for users in the structure 113.

Figure 8:
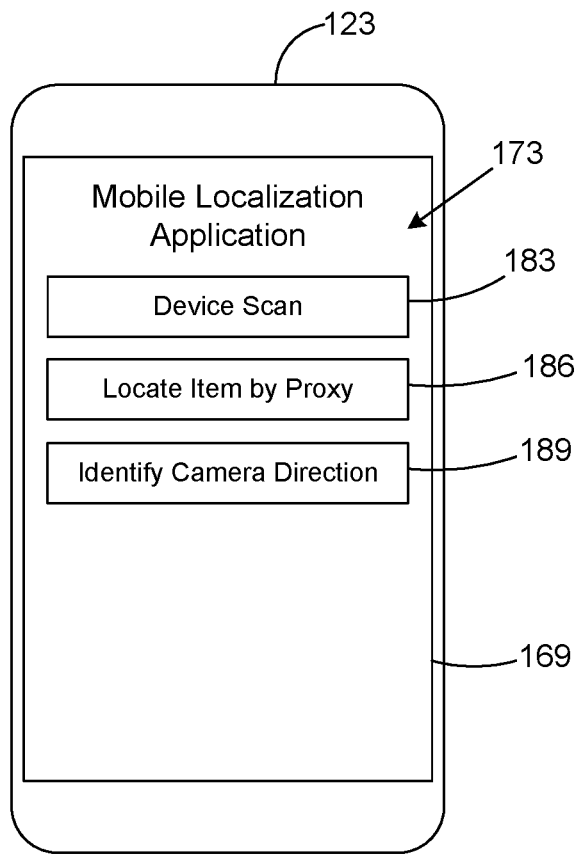
FIG. 8 is a drawing of a user interface generated on the mobile device of FIG. 1 according to various embodiments of the present disclosure.

With reference to FIG. 8, shown is an example of a user interface 173 rendered on the display 169 of the mobile device 123 by the mobile localization application 129 (FIG. 1) according to an embodiment of the present disclosure. The user interface 173 includes a device scan button 183, a Locate Item by Proxy button 186, an identify camera direction button 189, and potentially other elements.

When the device scan button 183 is manipulated, the mobile localization application 129 proceeds to generate the data that may be used to localize all smart devices 116 that can be localized without further user input including the smart devices 116a (FIG. 2) and 116b (FIG. 2), as well as self-identification signaling smart devices 116c. This is done while the user moves the mobile device 123 along the pathway 153 (FIG. 2) around the rooms of the structure 113 (FIG. 2).

In addition, the mobile device 123 may also proceed to generate a point cloud 163 (FIG. 4) while simultaneously generating data that is used to localize the smart devices 116.

While the mobile device 123 is moved around the pathway 153, the mobile localization application 129 facilitates a user tapping on the display 169 to generate the tap localization data to localize one or more smart devices 116c. Also, the mobile localization application 129 generates the self-identification signaling device data when a self-identification signaling mobile device 116c is detected as described above.

In one embodiment, the mobile localization application 129 facilitates the localization of as many smart devices 116 as possible without user input. As such, the list of possible devices that is presented to a user to select a particular smart device 116 when localizing devices by tapping or proxy is reduced to make it easier to find a particular smart device 116.

When the locate item by proxy button 186 is manipulated, the mobile localization application 129 proceeds to facilitate the localization of smart devices 116c by proxy. Also, when the identify camera direction button 189 is manipulated, the mobile localization application 129 facilitates determining where a camera associated with one of the smart devices 116 is directed as will be described.

Figure 9:
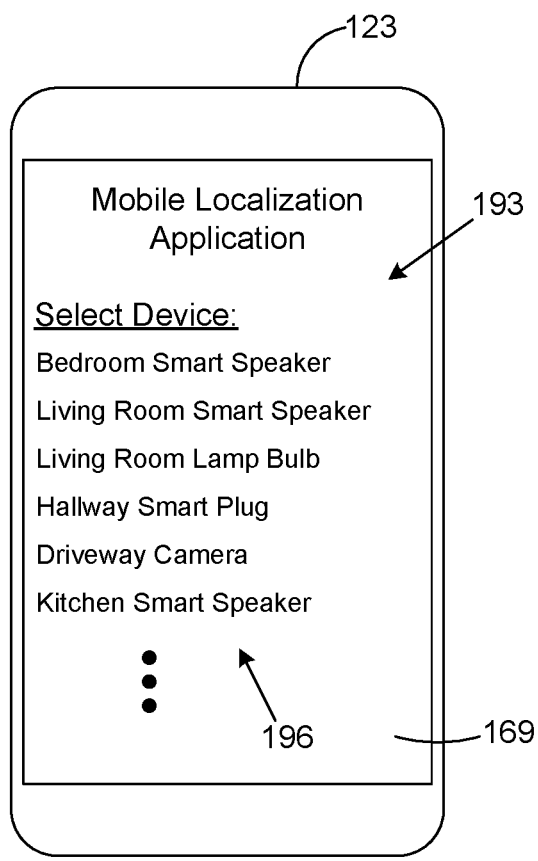
FIG. 9 is a drawing of another user interface generated on the mobile device of FIG. 1 according to various embodiments of the present disclosure.

Referring next to FIG. 9, shown is an example of another user interface 193 rendered on the display 169 of the mobile device 123 by the mobile localization application 129 (FIG. 1) according to an embodiment of the present disclosure. The user interface 193 is rendered in order to input a selection of a smart device 116 (FIG. 1) from among the one or more possible current nonlocalized smart devices 116 associated with the structure 113 (FIG. 1). As shown, the user interface 193 includes a smart device list 196 that sets forth a number of possible smart devices 116 from which a user may select in order to identify a smart device 116 that is to be localized with respect to tap localization data or proxy data as will be described.

Figure 10:
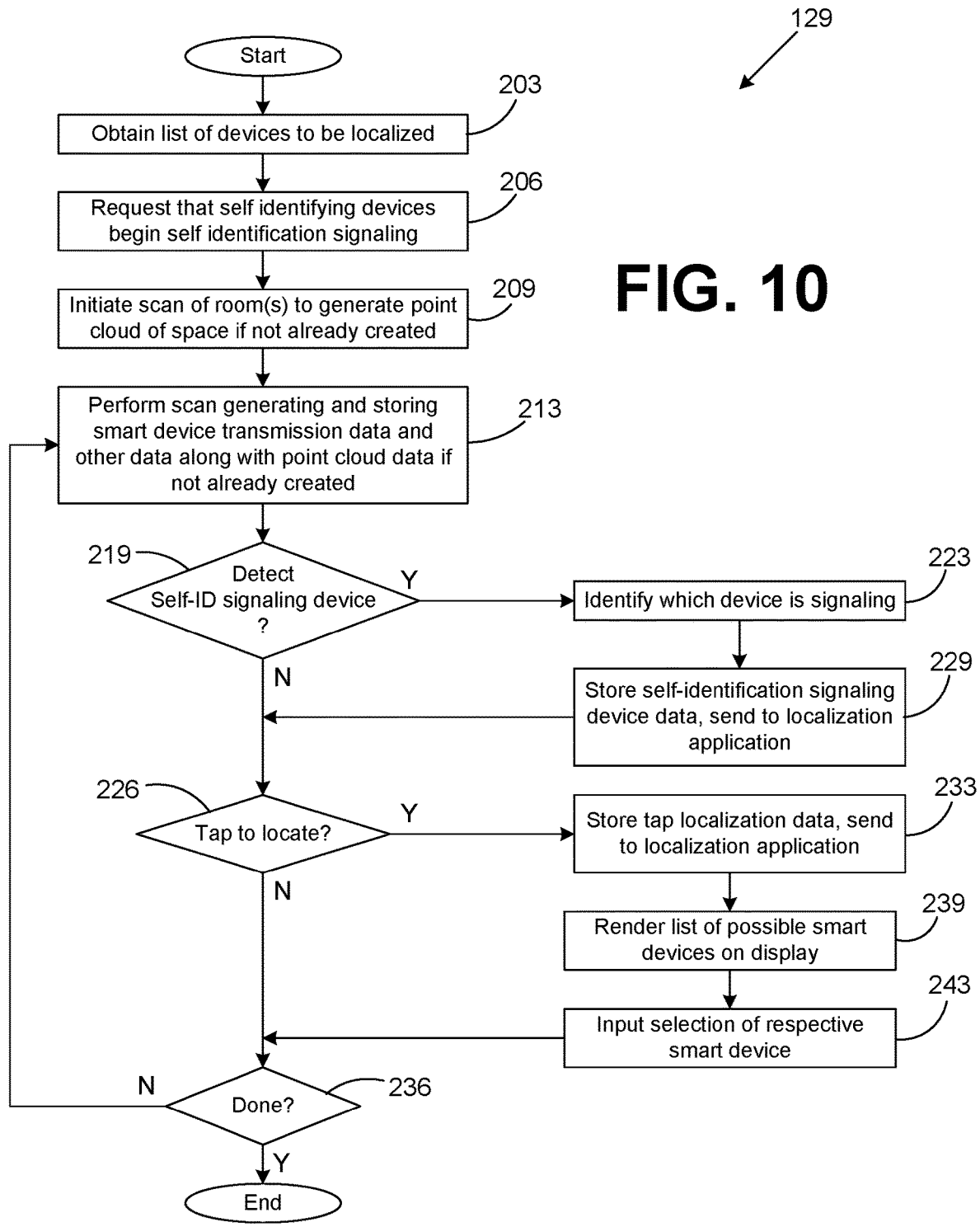
FIG. 10 is a flow chart depicting functionality for localization of smart devices in the structure of FIG. 1 according to various embodiments of the present disclosure.

Referring next to FIG. 10 shown is a flowchart that provides one example of the operation of at least a portion of the mobile localization application 129 according to various embodiments. It is understood that the flowchart of FIG. 10 provides merely an example of the many different types of functional arrangements that may be employed to implement the operation of the portion of the mobile localization application 129 as described herein. As an alternative, the flowchart of FIG. 10 may be viewed as depicting an example of elements of a method implemented in the mobile device 123 (FIG. 1) according to one or more embodiments.

The portion of the mobile localization application 129 depicted in FIG. 10 is executed when the device scan button 183 (FIG. 8) is manipulated in the user interface 173 (FIG. 8) or based on some other trigger that initiates execution.

Beginning with box 203, the mobile localization application 129 begins the scan for smart devices 116 (FIG. 1) within the rooms of the structure 113 (FIG. 1) by obtaining a list of smart devices 116 (FIG. 1) to be localized. This may be done, for example, by requesting the list of smart devices 116 from the digital virtual assistant 133 (FIG. 1). In this respect, the digital virtual assistant 133 may interact with the devices on the local area network 109 (FIG. 1) including the smart home hub 119 as can be appreciated.

Next, in box 206 the mobile localization application 129 sends a request to the digital virtual assistant 133 to cause all self-identification smart devices 116c (FIG. 2) to begin self-identification signaling so that they can be detected during a scan through the rooms of the structure 113. The digital virtual assistant 133 provides a listing of the smart devices 116c that are self-identification signaling, where the list includes the type of signal that is displayed by each respective smart device 116c. Thereafter, in box 209 a scan of the rooms of the structure 113 is initiated in the case that a point cloud 163 is to be generated at the same time that smart devices 116 are to be localized. In this respect, an image of at least a portion of a room of the structure 113 is rendered on the display 169 of the mobile device 123. In box 213, the mobile localization application 129 begins to generate and store the smart device transmission data that is detected from smart devices 116a as a user moves the mobile device 123 along a pathway 153 through the rooms of the structure 113. In addition, the point cloud 163 may be generated simultaneously if the point cloud 153 has not already been generated.

In box 219 it is determined whether a self-identification signaling smart device 116c has been detected. In particular, such a smart device 116c may be detected based upon the specific behavior of the device as directed by the digital virtual assistant 133. In this respect, the location in the image where a nonlocalized smart device 116c is depicted comprises a location of the self-identification signaling within the image. If a self-identification signaling smart device 116c is detected, then the mobile localization application 129 proceeds to box 223. Otherwise, execution moves to box 226 as shown.

In box 223, the mobile localization application 129 identifies which smart device 116c is signaling. For example, if the smart device 116c comprises a smart bulb, then it may be illuminated with a predefined color or caused to repeat a predefined on-off sequence, where the color or the predefined on-off sequence for each such smart bulb is unique with respect to all other smart bulbs associated with the structure 113. As mentioned above, the digital virtual assistant 133 provides a listing of the self-identification signaling smart devices 116c to the mobile localization application 129, where the listing sets forth the specific signaling behavior of each respective self-identification signaling smart device 116c.

Next, in box 229 the mobile localization application 129 stores the self-identification signaling device data that is acquired when the self-identification signaling smart device 116c is detected. The same data may be transmitted to the localization application 136 (FIG. 1) when the localization application 136 is to determine the location of the respective smart device 116c therefrom. Thereafter, the mobile localization application 129 proceeds to box 226.

In box 226, the mobile localization application 129 detects whether a tap or other contact on the image rendered on the display 169 has occurred indicating that a smart device 116c is depicted in the image generated on the display 169 (FIG. 5). Such a tap on the display 169 of the mobile device 123 may be detected, for example, during the generation of the point cloud 163, where the location in the image where a nonlocalized smart device 116c is depicted comprises a location of the tap relative to the image. Alternatively, the tap may on the display 169 of the mobile device 123 may occur at a time when the point cloud 163 is not being generated.

Assuming that the user has tapped the display 169, the mobile localization application 129 proceeds to box 233. Otherwise, the mobile localization application 129 moves to box 236.

In box 233 the tap localization data is stored in memory to be localized. Such tap localization data may include, for example, the position and orientation of the mobile device 123 within the structure 113, and the location of the tap on the display 169. This may be done while, simultaneously, the portion of the point cloud 163 that coincided with the image depicted on the display 169 is being generated assuming that the point cloud 163 has not been generated separately. For example, the tap on the display 169 may comprise an area of several pixels that is impacted by the portion of one's finger that comes into contact with the display 169. As such, the location of the tap on the display 169 may be calculated as an approximate center of such area.

In the case that localization is performed by the localization application 136, the tap localization data may be transmitted to the localization application 136. Thereafter, in box 239 the user interface 193 (FIG. 9) is generated on the display 169 that depicts the list of nonlocalized smart devices 116 associated with the structure 113. Then in box 243 the mobile localization application 129 inputs a selection of a respective one of the smart devices 116. The selected one of the smart devices 116 is associated with the instance of tap localization data generated by the tap on the display 169. Thereafter, the mobile localization application 129 proceeds to box 236. Note that the functionality of surfacing a list of nonlocalized smart devices 116 to input a selection as set forth in boxes 239 and 243 may be performed after as many of the smart devices 116a/b have been localized so as to reduce the number of smart devices 116 on the list to make selection of a respective smart device 116 easier.

In box 236 the mobile localization application 129 determines whether the scan of the smart devices 116 in the various rooms of the structure 113 is complete. Note that this may be indicated by a user manipulation of a respective user interface element that ends the scanning of the structure 113. If the scanning of the structure 113 to acquire data about the smart devices 116 is not complete in box 236, then the mobile localization application 129 reverts back to box 213 to continue the process. Otherwise, the process ends as shown.

Figure 11A:
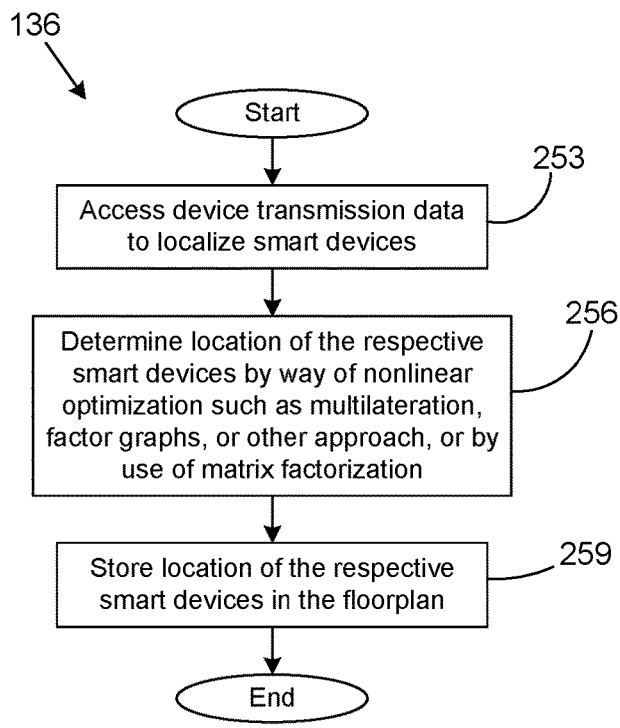
FIGS. 11A, 11B, and 11C are flow charts depicting further functionality for localization of smart devices in the structure of FIG. 1 according to various embodiments of the present disclosure.

Referring next to FIG. 11A shown is a flowchart that provides one example of the operation of at least a portion of the localization application 136 according to various embodiments. It is understood that the flowchart of FIG. 11A provides merely an example of the many different types of functional arrangements that may be employed to implement the operation of the portion of the localization application 136 as described herein. As an alternative, the flowchart of FIG. 11A may be viewed as depicting an example of elements of a method implemented in the computing environment 103 (FIG. 1) according to one or more embodiments.

Although the functionality as depicted in the flowchart of FIG. 11A is depicted as being implemented as part of the localization application 136 executed in the computing environment 103 (FIG. 1), the same functionality can be implemented by the mobile localization application 129 (FIG. 1) in the mobile device 123.

In box 253, the localization application 136 accesses smart device transmission data for respective smart devices 116a (FIG. 2). The smart device transmission data includes, for example, device identifiers, transmitted signal strengths, and locations where the signal strength of signals from corresponding smart devices 116a were measured.

Alternatively, the localization application 136 may access sonic ranging data for audio capable smart devices 116b (FIG. 2). In this respect, the distance between several positions of the mobile device 123 and the respective smart devices 116b may be accessed from memory.

Next, in box 256 the location of the respective smart devices 116a/b are determined based on the distances using one of a plurality of approaches including, for example, nonlinear optimization approaches such as multilateration, factor graphs, or other approach. Alternatively, other approaches such as matrix factorization may be employed. Thereafter, in box 259, the location of the respective smart devices 116a/b within the structure 113 (FIG. 1) are stored in memory. In this respect, the location of the respective smart devices 116a/b may be plotted on the structure floorplan 139. As such, the digital virtual assistant 133 (FIG. 1) can be made aware of the relative positioning of respective ones of the smart devices 116a/b within the rooms of a given structure 113 without user input beyond a scan of the rooms of the structure 113 (FIG. 1). Thereafter, the process ends as shown.

The localization application 136 allows the digital virtual assistant 133 to draw appropriate associations between respective pairs or groups of smart devices 116 to execute various commands made by users. For example, if a user asks a digital virtual assistant 133 through a specific smart device 116 to turn on certain media content on a digital media player, the digital virtual assistant 133 can consult the structure floorplan 139 to determine which digital media player is closest to the specific smart device 116 and cause the desired media content to be rendered by such digital media player.

Figure 11B:
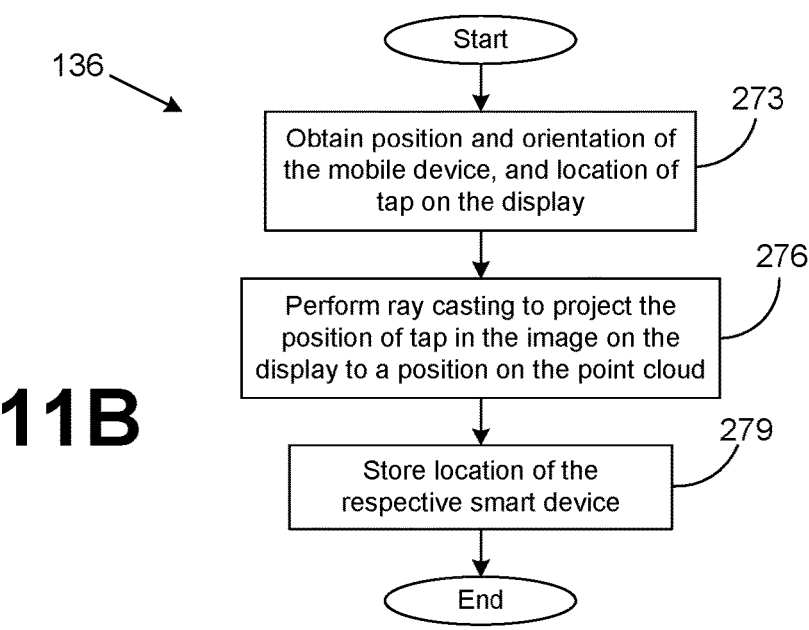

Referring next to FIG. 11B shown is a flowchart that provides another example of the operation of at least a portion of the localization application 136 that determines a location of a smart device 116c (FIG. 2) based on a tap on the display 169 (FIG. 5) according to various embodiments. It is understood that the flowchart of FIG. 11B provides merely an example of the many different types of functional arrangements that may be employed to implement the operation of the portion of the localization application 136 as described herein. As an alternative, the flowchart of FIG. 11B may be viewed as depicting an example of elements of a method implemented in the computing environment 103 (FIG. 1) or the mobile device 123 (FIG. 1) according to various embodiments.

Although the functionality as depicted in the flowchart of FIG. 11B is depicted as being implemented as part of the localization application 136 executed in the computing environment 103 (FIG. 1), the same functionality can be implemented by the mobile localization application 129 (FIG. 1) in the mobile device 123.

Beginning with box 273, the localization application 136 obtains the position and orientation of the mobile device 123 as well as the location of the tap on the display 169 by a user identifying where the respective smart device 116c is located on the display 169. In addition, the localization application 136 obtains the identity of the respective smart device 116c that was selected by the user as described with respect to boxes 239 (FIG. 10) and 243 (FIG. 10) above.

In box 276 the localization application 136 performs a ray casting operation to project the position of the tap on the image that includes the respective smart device 116c on the display 169 to a position on the point cloud 163. The ray casting operation is performed based on the position of the tap on the image or the display 169, the orientation of the mobile device 123, and the corresponding one of the positions of the mobile device 123 within one or more rooms of the structure.

In this respect, at least a portion of the point cloud 163 that coincides with the image on the display 169 that depicts the respective smart device 116c is created in order to perform the ray casting operation. In order to perform the ray casting operation, the point cloud 163 needs to be established at the point where the ray that is cast would intersect with the point cloud 163. Otherwise, any ray that is cast could not intersect the point cloud 163 to localize a respective smart device 116c.

In one embodiment, if the functionality set forth in FIG. 11B is executed by the mobile localization application 129, then the point cloud 163 may be generated simultaneously along with localization of the various smart devices 116 (FIG. 1). In the event that a tap localization is to occur as implemented by the flowchart of FIG. 11B, the point cloud 163 would need to be created at least with respect to the boundaries of the rooms of the structure 113 that appear in an image that depicts a respective smart device 116c for which a ray casting operation is to be performed to localize such smart device 116c.

Thereafter, in box 279, the location of the respective smart device 116c within the structure 113 (FIG. 1) is stored in memory. In this respect, the location of the respective smart device 116c may be plotted on the structure floorplan 139. As such, the digital virtual assistant 133 (FIG. 1) can be made aware of the relative positioning of respective ones of the smart devices 116 within the rooms of a given structure 113 without user input beyond a scan of the rooms of the structure 113 (FIG. 1). After box 279, the portion of the localization application 136 ends as shown.

Figure 11C:
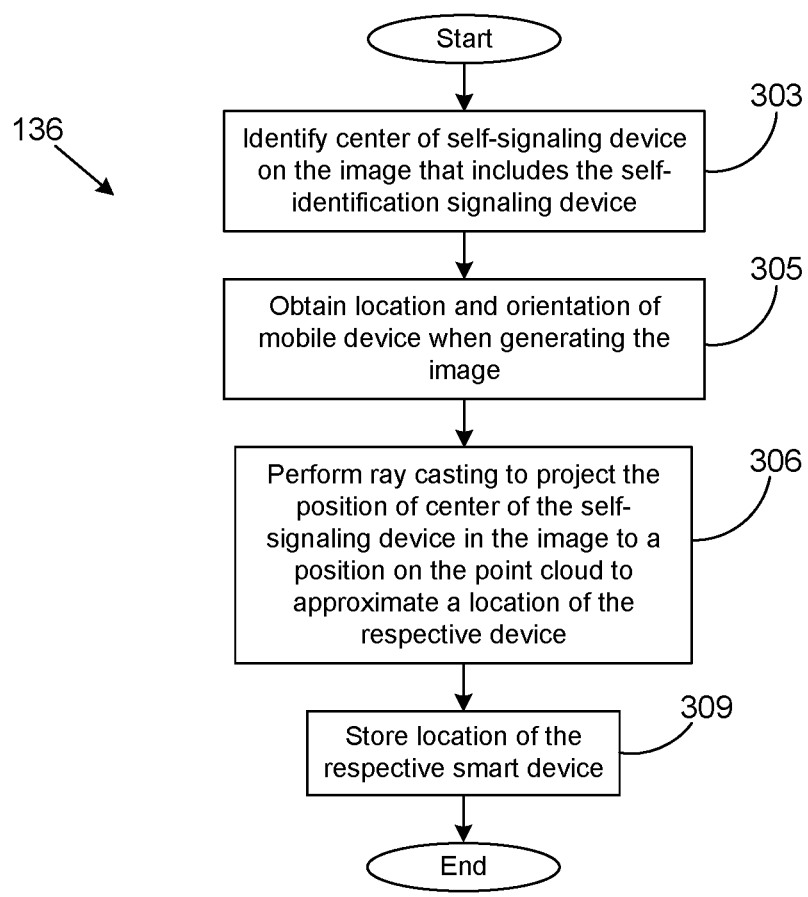

Referring next to FIG. 11C shown is a flowchart that provides another example of the operation of a further portion of the localization application 136 that determines a location of a smart device 116c (FIG. 2) based on self-identification signaling detected on the display 169 (FIG. 5) according to various embodiments. It is understood that the flowchart of FIG. 11C provides merely an example of the many different types of functional arrangements that may be employed to implement the operation of the portion of the localization application 136 as described herein. As an alternative, the flowchart of FIG. 11C may be viewed as depicting an example of elements of a method implemented in the computing environment 103 (FIG. 1) or the mobile device 123 (FIG. 1) according to various embodiments.

Although the functionality as depicted in the flowchart of FIG. 11C is depicted as being implemented as part of the localization application 136 executed in the computing environment 103 (FIG. 1), the same functionality can be implemented by the mobile localization application 129 (FIG. 1) in the mobile device 123.

Beginning with box 303, the localization application 136 identifies a center of the self-signaling smart device 116c in the image or clip of video that includes the self-signaling smart device 116c. For example, if the smart device 116c is a smart bulb that is self-identification signaling by being illuminated with a specific color, the approximate center of the illumination in a given image may be identified. Next, in box 305, the localization application 136 obtains the location and orientation of the mobile device 123 when it generated the image or clip of video that includes the self-signaling smart device 116c. Such information may be obtained from the smart device data 117 (FIG. 1) or from the memory in the mobile device 123. Thereafter, in box 306 the localization application 136 performs a ray casting operation to project the position of the self-identification signaling in the image that includes the respective smart device 116c to a position on the point cloud 163.

This is done based on the position and orientation of the mobile device 123 when the self-identification signaling smart device 116c was detected. That is to say, the ray casting operation is performed based on the position where the self-identification signaling smart device 116c is depicted on the image or the display 169, the orientation of the mobile device 123, and the corresponding one of the positions of the mobile device 123 within one or more rooms of the structure.

In this respect, at least a portion of the point cloud 163 that coincides with the image on the display 169 that depicts the respective smart device 116c would need to have been created in order to perform the ray casting operation. In order to perform the ray casting operation, the point cloud 163 needs to be established at the point where the ray that is cast would intersect with the point cloud 163. Otherwise, any ray that is cast could not intersect the point cloud 163 to localize a respective smart device 116c.

In box 309, the position on the point cloud 163 identified by way of the ray casting operation is then stored in memory in association with the respective smart device 116c. Thereafter, this portion of the localization application 136 ends as shown.

Figure 12:
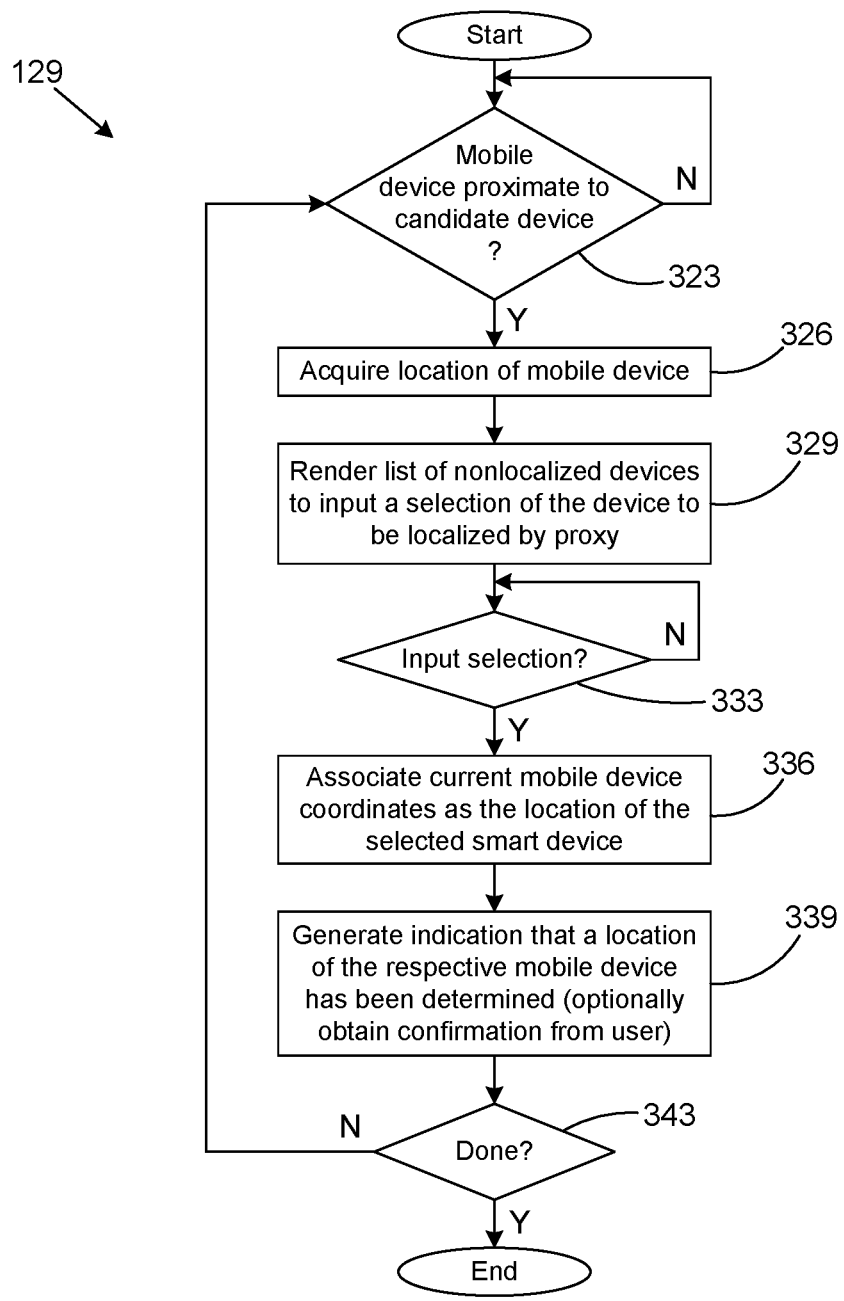
FIG. 12 is a flow chart depicting functionality for proximity localization of smart devices in the structure of FIG. 1 according to various embodiments of the present disclosure.

Referring next to FIG. 12 shown is a flowchart that provides another example of the operation of a further portion of the mobile localization application 129 that determines a location of a smart device 116c (FIG. 2) based on proximity between the smart device 116c and the mobile device 123 according to various embodiments. It is understood that the flowchart of FIG. 12 provides merely an example of the many different types of functional arrangements that may be employed to implement the operation of the portion of the mobile localization application 129 as described herein. As an alternative, the flowchart of FIG. 12 may be viewed as depicting an example of elements of a method implemented in the mobile device 123 (FIG. 1) according to various embodiments.

The portion of the mobile localization application 129 that provides for location of smart devices 116c by proximity may be executed when the Locate Item by Proxy button 186 is manipulated on the user interface 173 described above. Alternatively, the same may be executed at the time that a scan of the rooms of a structure 113 is performed to localize smart devices 116. In one embodiment, such a scan for smart devices 116 may be performed while, simultaneously, the mobile device 123 is scanning the rooms of the structure 113 to generate the point cloud 163 as was described above. As such, a user would be able to localize most, if not all, smart devices 116 in a single scan of the rooms of the structure 113.

Upon execution, in box 323, the mobile localization application 129 determines whether the mobile device 123 has been positioned at a proxy location relative to a given nonlocalized smart device 116c in the structure 113. There are a few approaches that may be employed to make this determination.

In the case that the smart device 116c transmits a radio frequency signal, the mobile device 123 may determine whether it is in close proximity to the respective smart device 116c depending on whether the signal strength is above a predefined threshold given the transmitted signal strength from the respective smart device 116c. Specifically, it is determined whether the mobile device 123 is positioned at the proxy location relative to the nonlocalized smart device 116c in the structure 113 by determining whether a received signal strength of a signal transmitted by the nonlocalized smart device 116c is of a magnitude indicating that the mobile device 123 is within a predefined distance from the nonlocalized smart device 116c.

Alternatively, the mobile device 123 may present a user interface that includes a button or other element that may be manipulated by a user after the mobile device 123 has been positioned in proximity to a given smart device 116c to confirm that the mobile device 123 is so positioned.

As an additional alternative, the mobile localization application 129 may determine whether the mobile device 123 has been placed by a given smart device 116 by consulting the inertial measurement unit (IMU) in the mobile device 123 as described above. The IMU can detect whether the mobile device 123 is still held by a user or has been placed on a surface based on the output of the IMU.

Assuming that it is determined that the mobile device 123 has been placed in proximity to a respective smart device 116c that is to be localized by proxy, the mobile localization application 129 proceeds to box 326 in which the location of the mobile device 123 is acquired from respective subsystems in the mobile device 123. Thereafter, in box 329 the smart device list 196 (FIG. 9) that sets forth a list of nonlocalized smart devices 116 associated with the structure 113 is rendered in the user interface 193 (FIG. 9) to obtain an indication from the user as to which nonlocalized smart device 116 is proximate to the mobile device 123.

In box 333, the mobile localization application 129 waits to receive a selection of a respective one of the smart devices 116 in the smart device list 196. Once a selection of a respective one of the smart devices 116 is received, execution proceeds to box 336 in which the coordinates indicating the location of the mobile device 123 are associated with the selected one of the smart devices 116 as stored in memory. In one embodiment, the respective smart device 116 may be included in a digital representation of one or more rooms of the structure 113. Thereafter, in box 339, a user interface may be generated on the display 169 of the mobile device 123 that indicates that a location of the respective mobile device 116c has been determined, thereby allowing the user to pick up the mobile device 123 to localize other smart devices 116 and/or generate the point cloud 163.

Next, in box 343, the mobile localization application 129 determines if execution is done or if execution should revert back to box 323 to detect that the mobile device 123 has been placed proximate to another smart device 116c. If the execution is done, then this portion of the mobile localization application 129 ends as shown. Otherwise, execution reverts back to box 323 as shown.

Figure 13:
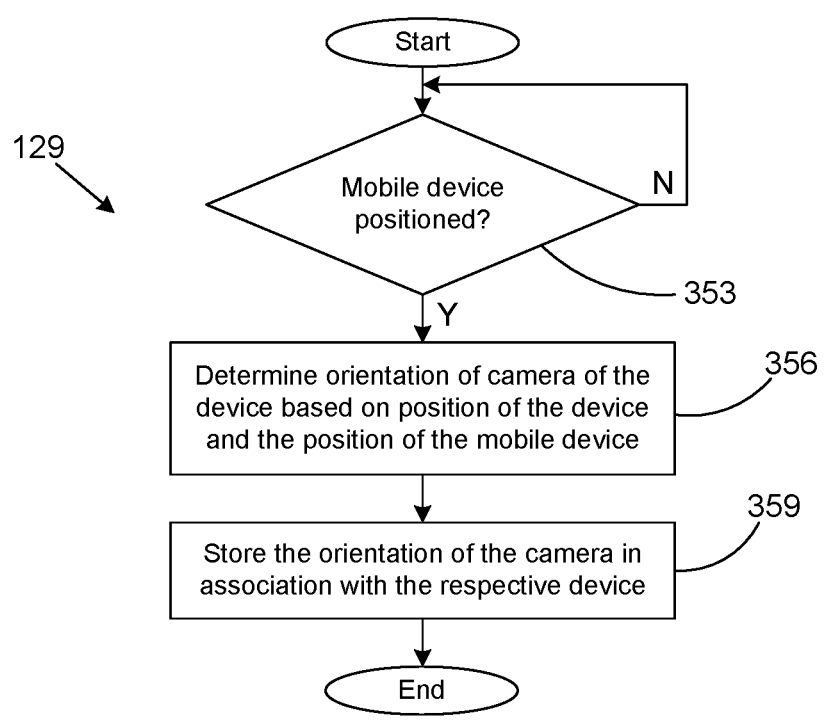
FIG. 13 is a flow chart depicting functionality to determine a direction of cameras associated with some smart devices in the structure of FIG. 1 according to various embodiments of the present disclosure.

Referring next to FIG. 13 shown is a flowchart that provides another example of the operation of a further portion of the mobile localization application 129 that determines an orientation of a camera associated with a respective one of the smart devices 116 (FIG. 1) based on a position of the mobile device 123 relative to a position of the respective one of the smart devices 116 according to various embodiments. It is understood that the flowchart of FIG. 13 provides merely an example of the many different types of functional arrangements that may be employed to implement the operation of the portion of the mobile localization application 129 as described herein. As an alternative, the flowchart of FIG. 13 may be viewed as depicting an example of elements of a method implemented in the mobile device 123 (FIG. 1) according to various embodiments.

In one embodiment, this portion of the mobile localization application 129 is executed when a user manipulates the Locate Item by Proxy button 186 (FIG. 8) in the user interface 173 (FIG. 8) as described above. Alternatively, this portion of the mobile localization application 129 may be executed upon an occurrence of some other trigger.

Beginning with box 353, the mobile localization application 129 determines whether the mobile device 123 is positioned relative to a given smart device 116 that includes a camera in order to determine an orientation of the camera. The positioning of the mobile device 123 in this manner may comprise placing the mobile device 123 directly in front of the camera of the respective smart device 116. To this end, the mobile device 123 may generate a user interface that provides instructions to the user with respect to placing the mobile device 123 relative to the camera of the respective smart device 116.

In box 356, the orientation of the camera of the respective smart device 116 is determined based upon the relative positions of the respective smart device 116 and the mobile device 123. In particular, an imaginary line may be drawn from the camera to the mobile device 123 where the direction of such line facing toward the mobile device 123 indicates the direction of the camera.

Next, in box 359, the orientation of the camera is stored in memory in association with the respective smart device 116. Also, the orientation of the camera of the respective smart device 116 may be communicated to the localization application 136 executed in the computing environment 103 so that such orientation may be depicted in the structure floorplan 139.

Thereafter, this portion of the mobile localization application 129 ends as shown.

Figure 14:
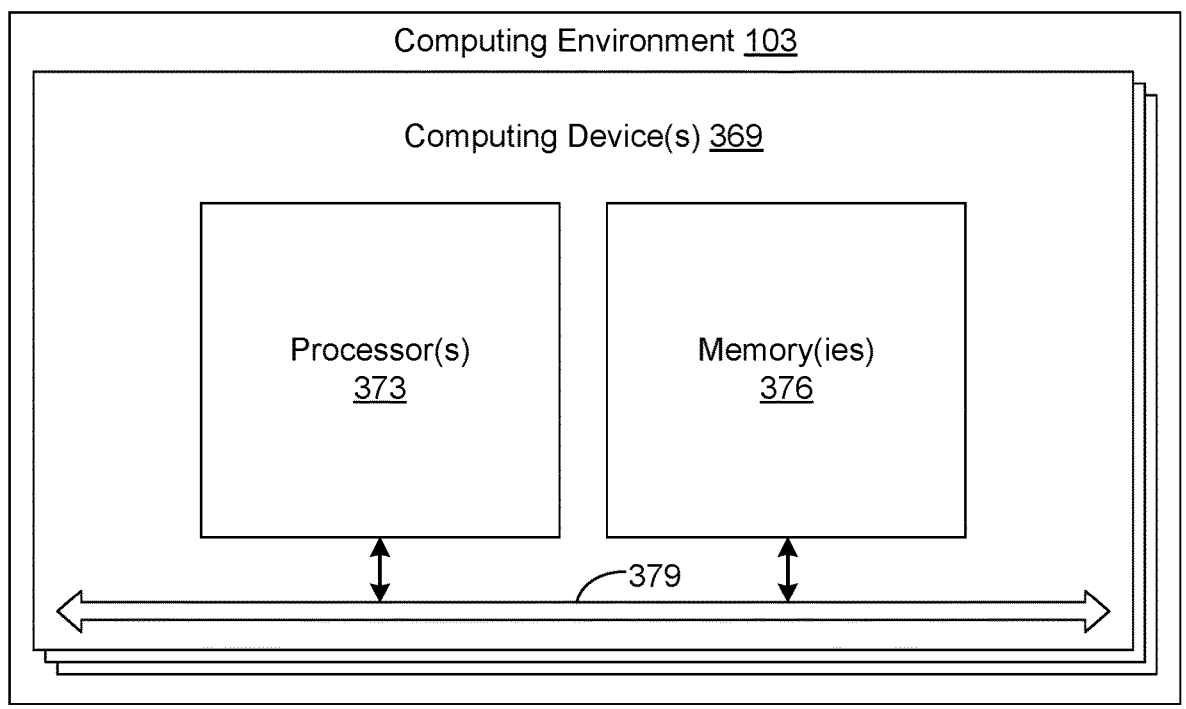
FIG. 14 is a schematic block diagram that provides one example illustration of a computing environment employed in the networked environment of FIG. 1 according to various embodiments of the present disclosure.

With reference to FIG. 14, shown is a schematic block diagram of the computing environment 103 according to an embodiment of the present disclosure. The computing environment 103 includes one or more computing devices 369. Each computing device 369 includes at least one processor circuit, for example, having a processor 373 and a memory 376, both of which are coupled to a local interface 379. To this end, each computing device 369 may comprise, for example, at least one server computer or like device. The local interface 379 may comprise, for example, a data bus with an accompanying address/control bus or other bus structure as can be appreciated.

The memory 376 is defined herein as including both volatile and nonvolatile memory and data storage components. Volatile components are those that do not retain data values upon loss of power. Nonvolatile components are those that retain data upon a loss of power. Thus, the memory 376 may comprise, for example, random access memory (RAM), read-only memory (ROM), hard disk drives, solid-state drives, and/or other memory components.

Although flowcharts depicted herein may show a specific order of execution, it is understood that the order of execution may differ from that which is depicted.

Also, any logic or application described herein that comprises software or code can be embodied in any non-transitory computer-readable medium for use by or in connection with an instruction execution system such as, for example, a processor 373 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system such as read only memory (ROM), random access memory (RAM), disk drives, solid state memory, and other types of memory.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory, computer-readable medium comprising machine-readable instructions that, when executed by a processor of a mobile device, cause the mobile device to:

generate a point cloud representing structural boundaries of at least one room of a structure from a sensor of the mobile device;

render an image of a portion of the at least one room of the structure on a display of the mobile device simultaneously during the generation of the point cloud;

store, in a memory, the image and a position and orientation of the mobile device relative to the at least one room of the structure where the image was rendered;

store, in the memory, a location in the image where a nonlocalized device is depicted, the nonlocalized device being positioned in the at least one room of the structure;

after at least a portion of the point cloud that coincides with the image is completed, calculate a position on the at least the portion of the point cloud based on the position and orientation of the mobile device, and based on the location in the image where the nonlocalized device is depicted;

identify the nonlocalized device from among a plurality of possible nonlocalized devices associated with the structure; and associate the position with the identified nonlocalized device, thereby localizing the nonlocalized device.

2. The non-transitory, computer-readable medium of claim 1, further comprising machine-readable instructions that, when executed by the processor of the mobile device, further cause the mobile device to detect a tap on the display of the mobile device during the generation of the point cloud, where the location in the image where a nonlocalized device is depicted comprises a location of the tap relative to the image.

3. The non-transitory, computer-readable medium of claim 1, further comprising machine-readable instructions that, when executed by the processor of the mobile device, further cause the mobile device to detect a self-identification signaling by the nonlocalized device in the image, where the location in the image where a nonlocalized device is depicted comprises a location of the self-identification signaling within the image.

4. The non-transitory, computer-readable medium of claim 1, wherein the calculating of the position on the at least the portion of the point cloud based on the position and orientation of the mobile device, and based on the location in the image where the nonlocalized device is depicted further comprises performing a ray casting operation.

5. A system, comprising:
a mobile device; and
at least one processor circuit in the mobile device, the at least one processor circuit having a memory comprising instructions that, when executed by the processor circuit, cause the at least one processor circuit to at least:
render an image of a portion of at least one room of a structure on a display of the mobile device;
determine a point in the image where a nonlocalized device is depicted, the nonlocalized device being positioned in the at least one room of the structure; and
localize the nonlocalized device in the at least one room of the structure based on a position and orientation of the mobile device relative to the at least one room of the structure and based on a location of the point in the image.

6. The system of claim 5, wherein the determining of the point in the image where a nonlocalized device is depicted further comprises identifying a position of a contact on the display depicting the image.

7. The system of claim 5, wherein the nonlocalized device further comprises a self-identifying device configured to perform self-identification signaling, and the determining of the point in the image where the nonlocalized device is depicted further comprises identifying an area in the image that depicts the self-identification signaling.

8. The system of claim 7, wherein the self-identifying device further comprises a light bulb, and the self-identification signaling further comprises illuminating the light bulb using a first color that is unique with respect to at least one second color of at least one second light bulb in the structure.

9. The system of claim 7, wherein the self-identifying device further comprises a light bulb, and the self-identification signaling further comprises cycling the light bulb according to a first on-off signaling sequence that is unique with respect to at least one second on-off signaling sequence of at least one other light bulb in the structure.

10. The system of claim 7, wherein the self-identifying device further comprises a light bulb, and the self-identification signaling further comprises illuminating the light bulb at a first level of brightness that is unique with respect to a second level of brightness of at least one other light bulb in the structure.

11. The system of claim 5, wherein the localizing the nonlocalized device in the at least one room of the structure further comprises:
performing a ray casting operation based on the position and orientation of the mobile device relative to the at least one room of the structure and based on the location of an area in the image to identify a position on a point cloud representing a plurality of structural boundaries of the at least one room of the structure; and
associating the position on the point cloud with the nonlocalized device.

12. The system of claim 11, wherein the associating of the position on the point cloud with the nonlocalized device further comprises:
rendering a list of possible nonlocalized devices on the display of the mobile device; and
inputting in the mobile device a selection of one of the possible nonlocalized devices as the nonlocalized device with which the position on the point cloud is associated.

13. The system of claim 12, wherein the display of the mobile device further comprises a touch screen.

14. The system of claim 7, wherein the rendering of the image and the determining of the point in the image are performed simultaneously with a generation of a point cloud in the mobile device, the point cloud representing a plurality of structural boundaries of the at least one room of the structure from a sensor of the mobile device.

15. A method comprising:
displaying, on a display of a user device, a first image generated using a camera of the user device, and one or more interface elements prompting a user to touch a position on the display corresponding to an electronic device to be localized;
receiving, at the user device, touchscreen input indicating a touch on a portion of the first image;
based on the touchscreen input, determining first location data indicating a first location of the user device relative to a first coordinate system associated with first point cloud data;
determining first orientation data indicating an orientation of the user device relative to the first coordinate system associated with the first point cloud data;
determining, based on first field of view data corresponding to a field of view of the camera and touch data indicating one or more pixels of the first image corresponding to the touch, first direction data indicating a first direction of a location corresponding to a touched pixel relative to the user device;
determining, based on the first direction data and the first orientation data, second direction data indicating a second direction of a location corresponding to the touched pixel relative to the first coordinate system;
performing, based on the second direction data and the first location data, a ray casting operation to determine one or more points of a point cloud intersected by a line projected from the first location in the second direction;
determining, based on the determining of the one or more points of the point cloud, second location data;

storing the second location data in association with an identifier of a first electronic device; and displaying, on the display of the user device, one or more interface elements indicating that the first electronic device has been localized.

16. The method of claim 15, wherein the method further comprises:

displaying, on the display of the user device, a list of electronic devices; and receiving, at the user device, second touchscreen input representing selection of the first electronic device from the list of electronic devices.

17. The method of claim 15, wherein the first electronic device comprises an indoor camera, television, or personal assistant device.

18. A non-transitory, computer-readable medium comprising machine-readable instructions that, when executed by a processor of a mobile device, cause the mobile device to:

render an image of a portion of at least one room of a structure on a display of the mobile device;

determine a point in the image where a nonlocalized device is depicted, the nonlocalized device being positioned in the at least one room of the structure; and localize the nonlocalized device in the at least one room of the structure based on a position and orientation of the mobile device relative to the at least one room of the structure and based on a location of the point in the image.

19. The non-transitory, computer-readable medium of claim 18, wherein the determining of the point in the image where a nonlocalized device is depicted further comprises identifying a position of a contact on the display depicting the image.

20. The non-transitory, computer-readable medium of claim 18, wherein the nonlocalized device further comprises a self-identifying device configured to perform self-identification signaling, and the determining of the point in the image where the nonlocalized device is depicted further comprises identifying an area in the image that depicts the self-identification signaling.

21. The non-transitory, computer-readable medium of claim 20, wherein the self-identifying device further comprises a light bulb, and the self-identification signaling further comprises illuminating the light bulb using a first color that is unique with respect to at least one second color of at least one second light bulb in the structure.

22. The non-transitory, computer-readable medium of claim 20, the self-identifying device further comprises a light bulb, and the self-identification signaling further comprises cycling the light bulb according to a first on-off signaling sequence that is unique with respect to at least one second on-off signaling sequence of at least one other light bulb in the structure.

23. The non-transitory, computer-readable medium of claim 20, wherein the self-identifying device further comprises a light bulb, and the self-identification signaling further comprises illuminating the light bulb at a first level of brightness that is unique with respect to a second level of brightness of at least one other light bulb in the structure.

* * * * *